US008341138B2

(12) United States Patent
Garg et al.

(10) Patent No.: US 8,341,138 B2
(45) Date of Patent: *Dec. 25, 2012

(54) PROVIDING CONTENT USING STORED QUERY INFORMATION

(75) Inventors: Ashutosh Garg, Sunnyvale, CA (US); Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,143

(22) Filed: Aug. 12, 2011

(65) Prior Publication Data

US 2011/0295831 A1    Dec. 1, 2011

Related U.S. Application Data

(63) Continuation of application No. 12/022,577, filed on Jan. 30, 2008, now Pat. No. 8,024,316.

(51) Int. Cl.
*G06F 17/30* (2006.01)
(52) U.S. Cl. ...................................................... 707/706
(58) Field of Classification Search .............. 707/5, 708, 707/706; 725/32
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,072,496 A | 6/2000 | Guenter et al. | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,324,296 B1 | 11/2001 | McSheery et al. | |
| 6,401,075 B1 | 6/2002 | Mason et al. | |

(Continued)

FOREIGN PATENT DOCUMENTS

KR    1020040026167    3/2004

(Continued)

OTHER PUBLICATIONS

U.S. Appl. No. 95/001,073, filed Sep. 30, 2004, Reexamination of Stone et al.

(Continued)

*Primary Examiner* — Etienne Leroux
(74) *Attorney, Agent, or Firm* — Fish & Richardson P.C.

(57) ABSTRACT

Among other disclosed subject matter, a computer-implemented method relating to providing content on a page includes receiving information for providing content for an access device in response to a navigation from a first page to a second page. The content is to be included in the second page. The method includes accessing query information stored on the access device, the query information based on a first query that was submitted from the access device to a search provider before navigating to the first page. The method includes providing the content for inclusion in the second page, the content selected using at least the received information and the accessed query information. A computer-implemented method can include recording search query information for a user; retrieving the search query information; and using the search query information to determine content for display to the user.

20 Claims, 5 Drawing Sheets

U.S. PATENT DOCUMENTS

| | | | |
|---|---|---|---|
| 6,985,882 B1 | 1/2006 | Del Sesto | |
| 7,039,599 B2 | 5/2006 | Merriman | |
| 7,136,875 B2 | 11/2006 | Anderson et al. | |
| 8,024,316 B2 * | 9/2011 | Garg et al. | 707/708 |
| 2003/0050863 A1 | 3/2003 | Radwin | |
| 2004/0155962 A1 | 8/2004 | Marks | |
| 2005/0283464 A1 | 12/2005 | Allsup et al. | |
| 2006/0004732 A1 | 1/2006 | Odom | |
| 2006/0136528 A1 | 6/2006 | Martin et al. | |
| 2006/0218115 A1 | 9/2006 | Goodman et al. | |
| 2007/0157227 A1 * | 7/2007 | Carpenter et al. | 725/32 |
| 2008/0052152 A1 | 2/2008 | Yufik | |
| 2008/0082485 A1 | 4/2008 | Church et al. | |
| 2008/0263025 A1 * | 10/2008 | Koran | 707/5 |
| 2008/0294523 A1 | 11/2008 | Little | |
| 2009/0024718 A1 | 1/2009 | Anagnostopoulos et al. | |
| 2009/0132340 A1 * | 5/2009 | Demir et al. | 705/10 |

FOREIGN PATENT DOCUMENTS

| | | |
|---|---|---|
| WO | WO 97/21183 | 6/1997 |

OTHER PUBLICATIONS

U.S. Appl. No. 95/001,061, filed Sep. 3, 2002, Reexamination of Stone et al.

U.S. Appl. No. 95/001,069, filed Jul. 11, 2002, Reexamination of Dean et al.

U.S. Appl. No. 95/001,068, filed Dec. 7, 2002, Reexamination of Stone et al.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

Examination Report from WIPO, for application No. GB0718003.7, mailed Aug. 3, 2009, 2 pages.

PCT Notification of International Search Report & Written Opinion, for application No. PCT/US2009/032399 mailed Aug. 10, 2009, 12 pages.

'Cookie' [online], Web Archive, [published on Nov. 11, 2007] [retrieved on Sep. 16, 2009]. Retrieved from the internet: http://web.archive.org/web/20071111015055/http://en.wikipedia.org/wiki/Http_cookie.

'Web Search Query' [online], Web Archive, [published on Nov. 30, 2007] [retrieved on Sep. 16, 2009]. Retrieved from the internet: http://web.archive.org/web/20071130060537/http://en.wikipedia.org/wiki/web_search_query.

European Search Report and Written Opinion for Application No. 09706077.6, dated Apr. 7, 2011, 5 pages.

\* cited by examiner

PROVIDING CONTENT USING STORED QUERY INFORMATION

REFERENCE TO RELATED APPLICATION

This application claims priority as a continuation of U.S. patent application Ser. No. 12/022,577, filed Jan. 30, 2008, entitled "Providing Content Using Stored Query Information," the contents of which are incorporated herein by reference.

TECHNICAL FIELD

This document relates to providing content using stored query information.

BACKGROUND

Advertising in online mediums have some similarities with traditional print-based advertising. For example, it is usually desirable to target the advertisement to the intended or expected audience, because advertisers generally prefer to invest in advertising if it reaches many potential customers, as opposed to persons who have little or no interest in the product or service being advertised. In print media, this targeting could be based on the general knowledge about who the readers are, or market investigations can be performed on the readers to more accurately determine their interests.

In the online environment, the users likewise have particular interests and disinterests, and publishers sometimes try to match the advertisement displayed on a page to the particular viewer as well as possible. However, much of the information required to understand who the viewers are may not be known or readily available and thus the advertisement targeting may be based on little or no relevant information.

SUMMARY

The invention relates to providing content using stored query information.

In a first aspect, a computer-implemented method relating to providing content on a page includes receiving information for providing content for an access device in response to a navigation from a first page to a second page. The content is to be included in the second page. The method includes accessing query information stored on the access device, the query information based on a first query that was submitted from the access device to a search provider before navigating to the first page. The method includes providing the content for inclusion in the second page, the content selected using at least the received information and the accessed query information.

Implementations can include any, all or none of the following features. The content can include at least one advertisement to be presented on the second page. An advertisement server can receive the information, access the query information and provide the content, and the search provider can include a search engine to which the first query was submitted. The query information can be included in a cookie stored on the access device, and the advertisement server can read the cookie in accessing the query information. The method can further include receiving the first query at the search provider, the first query submitted by a user using a first previous page displayed before the first page; displaying a second previous page to the user in response to the first query, the second previous page including a result of performing the first query and at least one link, the link directed to the first page; receiving a first user input initiating a navigation from the second previous page to the first page using the link; displaying the first page, the first page including at least one link, the link directed to the second page; receiving a second user input initiating the navigation from the first page to the second page using the link on the first page; and displaying the second page including the content selected for the second page. The method can further include providing content for the second previous page based on the first query. The method can further include providing content for the first page based on the first query. The method can further include storing the query information on the access device before receiving the information, the query information based on other information received for providing content for the first page on the access device, the other information provided from the search provider upon receiving the first query from the access device. Multiple portions of query information can have been stored on the access device, and the method can further include selecting the query information to be accessed, the query information selected from among the multiple portions. The selection is based on at least one selected from: a time of the first query, a time the query information was stored on the access device, a number of navigations undertaken since the first query, and combinations thereof.

In a second aspect, a computer program product is tangibly embodied in a computer-readable storage medium and includes instructions that when executed by a processor perform a method relating to providing content on a page. The method includes receiving information for providing content for an access device in response to a navigation from a first page to a second page, the content to be included in the second page. The method includes accessing query information stored on the access device, the query information based on a first query that was submitted from the access device to a search provider before navigating to the first page. The method includes providing the content for inclusion in the second page, the content selected using at least the received information and the accessed query information.

In a third aspect, a computer-implemented method relating to providing content on a page includes obtaining information for providing content for a first page on an access device. The information is extracted from a referring URL in navigation to the first page, the information reflecting a first query submitted from the access device to a search provider. The method includes providing the content for inclusion in the first page, the content selected using at least the obtained information. The method includes storing query information on the access device based on the obtained information, the query information reflecting the first query and configured for use in providing content for at least a second page.

Implementations can include any, all or none of the following features. The method can further include receiving the first query at the search provider, the first query submitted by a user using a first previous page displayed before the first page; displaying a second previous page to the user in response to the first query, the second previous page including a result of performing the first query and at least one link, the link directed to the first page; receiving a first user input initiating a navigation from the second previous page to the first page using the link; and displaying the first page, the first page including the selected content and at least one link, the link directed to the second page. The method can further include receiving information for providing the content for the second page in response to a navigation from the first page to the second page; accessing the query information on the access device; and providing the content for inclusion in the second page, the content selected using at least the received information and the accessed query information. The method can further include performing the extraction of the information from the referring URL. Performing the extraction can include parsing the referring URL for at least one key word of the first query. The method can further include selecting one of multiple templates for parsing the referring URL, each of the multiple templates configured for parsing referring URLs from a corresponding search engine; and parsing the referring URL using the selected template.

In a fourth aspect, a computer program product is tangibly embodied in a computer-readable storage medium and includes instructions that when executed by a processor perform a method relating to providing content on a page. The method includes obtaining information for providing content for a first page on an access device, the information extracted from a referring URL in navigation to the first page, the information reflecting a first query submitted from the access device to a search provider. The method includes providing the content for inclusion in the first page, the content selected using at least the obtained information. The method includes storing query information on the access device based on the obtained information, the query information reflecting the first query and configured for use in providing content for at least a second page.

In a fifth aspect, a computer-implemented method includes recording search query information for a user. The method includes retrieving the search query information. The method includes using the search query information to determine content for display to the user.

Implementations can provide any, all or none of the following advantages. Computer-based advertising can be improved. Advertisements can be selected based on a search history of the user. The user's search history can be made available for content selection also after the user navigates away from a page with search results. Information highly indicative of user interests can be obtained for selecting content at a point where little or no other relevant information about the user is available. Information highly indicative of current user information needs can be obtained for selecting content at a point where little or no other relevant information about the user is available.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
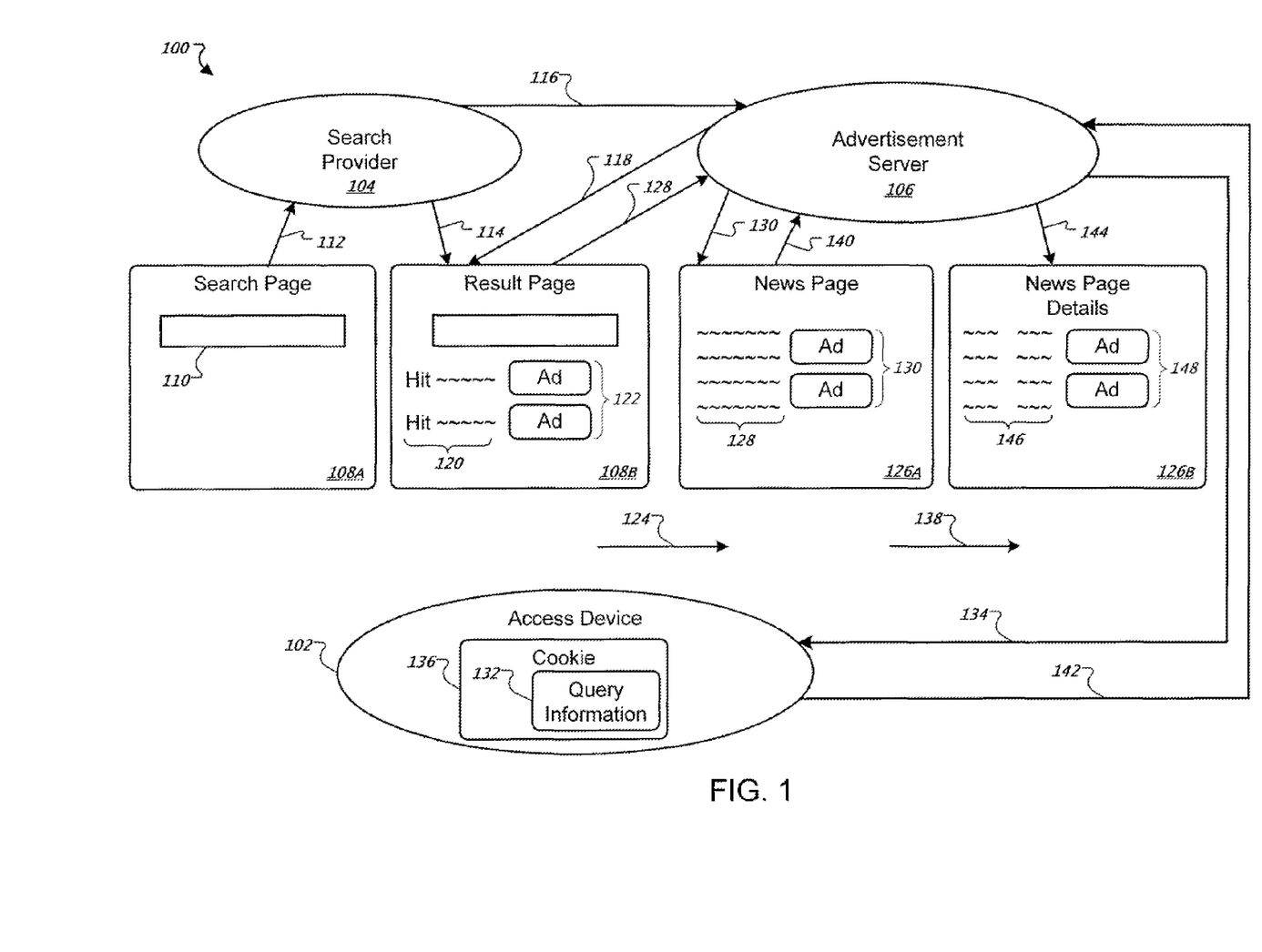
FIG. 1 schematically shows an example of a system where pages are provided to an access device using a search provider and/or an advertisement server.

FIG. 1 schematically shows an example of a system 100 where content (e.g., pages) is provided to an access device 102 using a search provider 104 and/or an advertisement server 106. Access device 102 allows a user to connect to the search provider 104 and run one or more searches for electronic content, such as queries on an information collection obtained from the internet or any other computer-based resource. It will be described in following examples that query information relating to one or more such performed searches can be stored and used in providing content (e.g., in providing an advertisement or any other information) for display to a user of the access device. Other architectures than the one shown can be used, including some that do not have a client-server configuration. While reference will be made herein to providing pages of content or providing advertisements on a page, other forms of information including other forms of sponsored content can be provided to a user in various forms.

Here, the search provider 104 provides a page 108A for display on the access device 102 where the user can formulate a search, and also provides a page 108B for display on the access device 102 that presents corresponding search results. That is, the user can enter one or more portions of information using an input control 110 (e.g., the user enters keyword(s) in a search field). The page 108A provides that the entered query is forwarded to the search provider 104 as indicated by arrow 112. In some implementations, the search page 108A constitutes the outward interface of a search engine comprised in the search provider 104. Any of many different devices can be used for the access device, such as a personal computer, a handheld device or a cellular telephone, to name a few examples.

The search provider 104 receives the forwarded query and performs a search according to its preprogrammed search routine(s). For example, the search provider can compare one or more search terms against an index and then identify any resource whose index entry matches the search term(s). Such results can be forwarded to the access device for display in the results page 108B as indicated by arrow 114.

The search provider 104 can facilitate that additional content be included in the results page 108B. For example, one or more advertisements can be included. In some implementations, the search provider can directly provide the additional content to the access device. For example, when an advertisement is to be included, the search provider can select the advertisement and include it with the search results.

In other implementations, one or more other components can be used to provide the additional content. Here, the system 100 uses the advertisement server 106 to provide advertising content for one or more pages. In this example, the advertising content is to be selected based on some aspect about the performed search, based on the user and/or based on the access device, to name a few examples. That is, in at least one implementation, the advertisement is to be matched, in some sense, to the screen where it is to appear. Alternatively, as will be discussed in greater detail below, in some implementations, the advertisement is matched based on one or more historical searches that have been performed by a user and may have little or no relation to the screen where it is to appear.

To facilitate such matching, the search provider 104 can forward information about the search and/or the access device and/or the user to the advertisement server 106. The forwarding is here indicated by an arrow 116. In some implementations, the provided information can include one or more search terms and/or information about the user or the access device. The advertisement server uses the received information to select the additional information according to its preprogrammed selection routine(s). For example, the advertisement server can make a selection in a library of advertisements based on matches with words received from the search provider. The advertisement server can provide the additional content for display in the page 108B either through the search provider, or by another communication to the access device 102, to name a few examples, as indicated by an arrow 118.

The results page 108B can be displayed with contents that include search result contents 120 (e.g., one or more hits from a keyword search) and additional content 122 (e.g., one or more advertisements selected based on some criterion). In some implementations, the additional content can be selected based on available information, such as the submitted query and/or any available information about the user and/or the access device. Some or all of the contents 120 and 122 can be presented in form of navigation features, such as hyperlinks, by which the user can navigate from the page 108B to an associated resource where more content is available.

Here, the user initiates such a navigation using one of the navigation features, as indicated by a navigation arrow 124. Particularly, the user is choosing to navigate to a news page 126A that in this example is a main (or "portal") page for a news organization. For example, the news page 126A can be the page that appears after a user navigates to the web address www.nytimes.com. Such a page can be considered an entrance page for a collection of pages (collectively referred to as a web site or a network site) that the news organization publishes under a common name. From the page 126A the user can navigate directly to some or all other pages in such a collection, here exemplified by a page 126B. Such other pages are sometimes referred to as "deeper" (or "deep") pages because they are located further down in a vertical hierarchy of the pages on the site. The deep page 126B can have more concentrated or homogeneous content than the news page 126A, for example because the deep page 126B presents the continuation of a single story introduced on the main page 126A. The page 126B sometimes has fewer navigation features to other pages of the site than does the page 126A.

In this example, the navigation 124 to the news page 126A may have begun in the results content 120 (e.g., the user may have clicked on a search hit), or it may have begun in the additional content 122 (e.g., the user may have clicked on an advertisement), to name a few examples. In any event, additional content can be provided also on the page 126A. That is, the publisher of the page 126A here has provided that the page 126A should be published including not only main content 128 (e.g., news material and/or links to deeper pages) but also additional content 130 (e.g., one or more advertisements). Such additional content can be selected using available information about the previous search, the access device and/or the user, to name a few examples.

Here, information about the page 108B is available in form of a referring uniform resource locator (URL). That is, when the user initiates the navigation 124, there can be provided information about the page 108B from which the navigation originated. Such information can be received by a server for the page 126A, or by an intermediary entity that redirects the navigation to the intended target, or by the advertisement server, to name a few examples. The referring URL can include essentially the URL of the page 108B. In some implementations, such a URL reflects the query that the user entered on the page 108A. As such, the referring URL can provide information on the query that led to the results page 108B, and this information can be used for one or more purposes. Thus, the advertisement server 106 can obtain information extracted from a referring URL in navigation to a page, the information reflecting a first query submitted from an access device to a search provider.

First, information from the referring URL can be used in providing additional content (e.g., an advertisement) for the page 126A. For example, the referring URL (or information obtained from it) can be forwarded to the advertisement server 106 as indicated by an arrow 128. If the received information is in a different format than necessary, the advertisement server can reformat, translate or otherwise manipulate the information before using it. In other implementations, such processing can be performed by another entity and the processed information can be forwarded to the advertisement server. The advertisement server can select the additional content (e.g., choose a matching advertisement) and provide the content to the access device, as indicated by an arrow 130, for display in the page 126A.

Second, information from the referring URL can be stored for future use. For example, the advertisement server 106 can store query information 132 on the access device 102 as indicated by an arrow 134. The query information can include any key word(s) entered by the user on the search page 108A, to name just one example. Such terms reflect the query that the user previously submitted and they can be obtained by extracting content from the referring URL. Thus, query information can be stored on the access device based on the obtained information, the query information reflecting an earlier query and configured for use in providing content for at least another page. The query information can be stored as part of at least one cookie 136 or any other structure on the access device. The stored query information can be available on the access device for one or more purposes, such as to reflect the user's previous search history for use in targeting an advertisement to the user.

One reason that it may be advantageous to store the query information, and later access it, is that such query information can be particularly reflective of the user's interests. For example, many users enter queries in search engines because they are interested in a particular product or service. Particularly, when the user later navigates to the deeper page 126B, such query terms from a previous search may be among the more indicative information available at that point about the user's interests. Thus, by knowing what query or queries a user has previously entered, one may be able to better target advertisements (or other content) to that particular user's interests.

The storing and later accessing of user-specific information is done in accordance with applicable laws and other standards. For example, where rules for protecting user privacy regulate the amount of information that can be stored after a user performs a search, this can be taken into account in storing the query information. Likewise, if rules restrict the amount of information that can be read from a user's device (e.g., in form of cookies) this can be taken into account in determining what information is to be accessed.

Here, the user navigates from the news page 126A to the deeper page 126B, for example using a link to the continuation of an article. This navigation is schematically illustrated by an arrow 138. Information may be provided to the advertisement server 106, as indicated by an arrow 140, for use in selecting additional content to be placed on the page 126B. Thus, the advertisement server can receive information for providing content for the access device in response to the navigation 138 from the news page 126A to the deeper page 126B, the content to be included in the deeper page 126B. This information can, for example, reflect the referring URL (i.e., the URL of the news page 126A). Other information that can be forwarded includes available user information and information about the access device 102, to name a few examples. Thus, the forwarded information can indicate that the navigation 138 originated through a link on the page 126A (and was not initiated, say, using a link on a different page or by the user directly typing the URL of the page 126B into an address field of a browser). However, the information forwarded at the arrow 140 may not reflect the search that was previously performed for the user (e.g., the referring URL of the page 126A is different from the URL for the results page 108B and therefore does not include any of the user's search terms). Thus, if the advertisement server were to provide additional content based only on the referring URL and optionally on any available information about the user or the access device, it is possible that the advertisement server would not be able to include content that is highly relevant in view of the search.

For this and/or other purposes, the query information 132 can be accessed, as indicated by an arrow 142. For example, the advertisement server 106 can access the query information by reading the cookie 136 on the access device. In this example, it was the advertisement system that placed the cookie on the access device, so the advertisement system is able to read its own cookie. In other implementations, another component can place and/or access the cookie and/or the query information. Here, the advertisement server reads the user's previous query from the query information and uses this information to select additional content for the page 126B (e.g., the advertisement server selects an advertisement that matches, or is otherwise relevant to, the key words that the user previously entered). Thus, the advertisement server can access the query information stored on the access device, the query information based on an earlier query that was submitted from the access device to the search provider 104 before navigating to the news page 126A.

The advertisement server 106 can provide the additional content to the access device for inclusion in the page 126B, as indicated by an arrow 144. Here, the page 126B includes content 146 (e.g., article content) and additional content 148 (e.g., one or more advertisements). After the navigation 138 the user can view the page 126B and, as noted, this page can include additional content selected using information about one or more searches that the user performed earlier in the navigation history. Thus, the advertisement server can provide the content 148 for inclusion in the deeper page 126B, the content selected using at least the received information and the accessed query information. Query information can be stored in any of many different formats, as will now be described in some examples.

Figure 2:
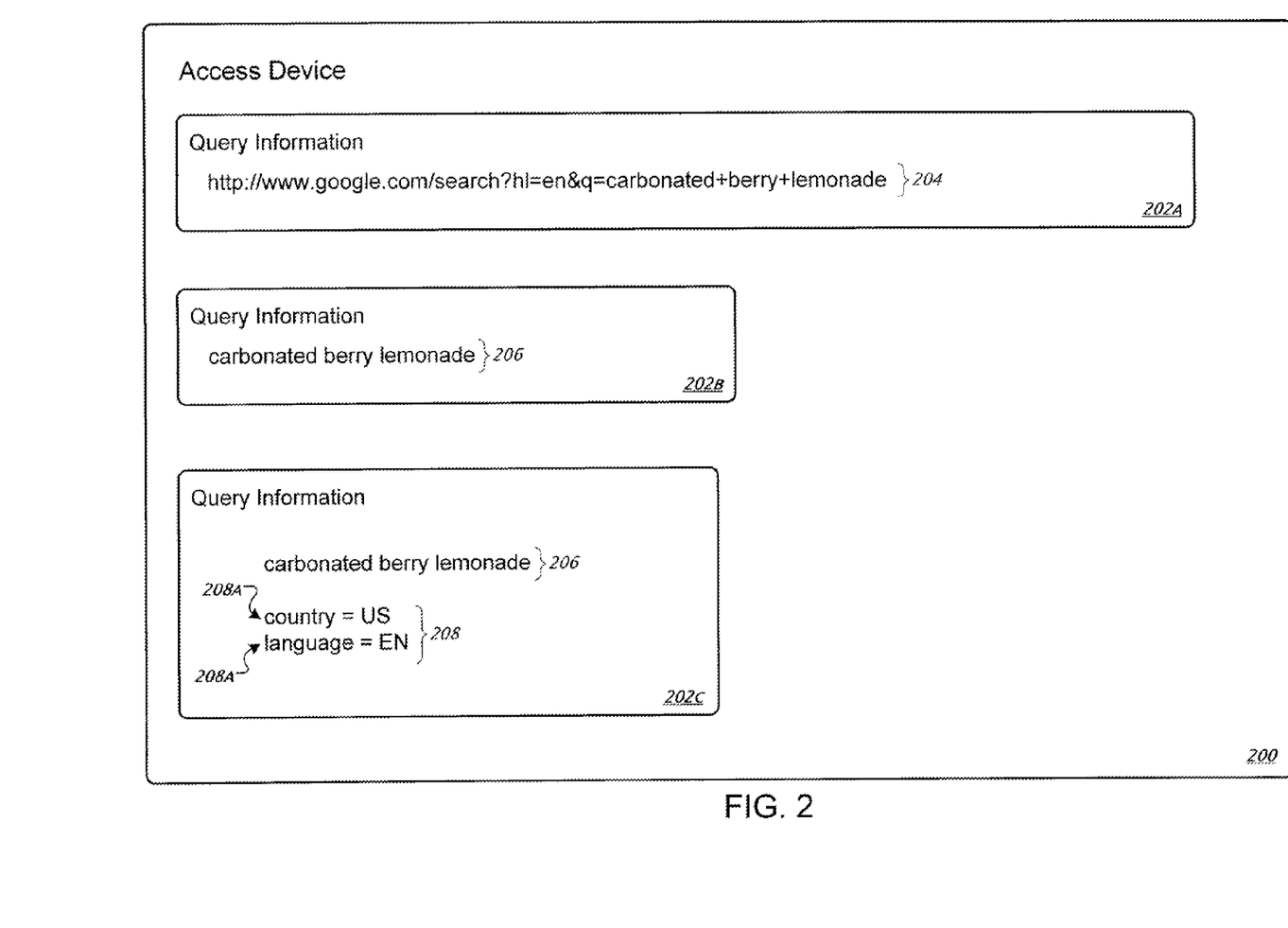
FIG. 2 shows examples of query information stored on an access device.

FIG. 2 shows examples of query information stored on an access device 200. In some implementations, the access device 200 can be the same as or similar to the access device 102 described above with regard to the examples of FIG. 1. Particularly, the access device 200 here includes some exemplary portions of query information 202 that can reflect one or more queries that a user has previously submitted.

A first query information 202A includes a URL 204 that can appear after a search is performed using the Google search engine available at www.google.com. Here, the URL 204 reflects that the search was based on the three key words carbonated, berry and lemonade. Accordingly, the results page that displays hits from the query for these words can be associated with the URL 204. An entity that accesses the query information 202A can extract one or more of the words carbonated, berry and lemonade from the URL 204 and use these words to provide content (e.g., an advertisement) for a page to be displayed. In some implementations, the extraction can be done by parsing the URL 204 with a template associated with the search engine, as will be described in examples below.

A second query information 202B includes terms 206. Here, the terms 206 are the key words carbonated, berry and lemonade extracted from a search that the user previously submitted to a search provider. For example, the terms 206 may have been extracted from a referring URL similar to the URL 204. One or more of the terms 206 can be obtained from the query information 202B and used to provide content (e.g., an advertisement) for a page to be displayed.

A third query information 202C includes the terms 206 and one or more other information portions 208. Here, the query information includes a country information 208A and a language information 208B. The country information can indicate a country where the access device 200 is located, for example. The language information 208B can indicate a relevant language. This can be a language commonly spoken in the country of the information 208A, a language known to be associated with the user of the access device 200, or a language associated with a search page (e.g., the search page 108A) where the user entered the query that resulted in the terms 206, to name just a few examples. One or more of the terms 206 and/or one or more of the information portions 208 can be obtained from the query information 202C and used to provide content (e.g., an advertisement) for a page to be displayed.

Figure 3:
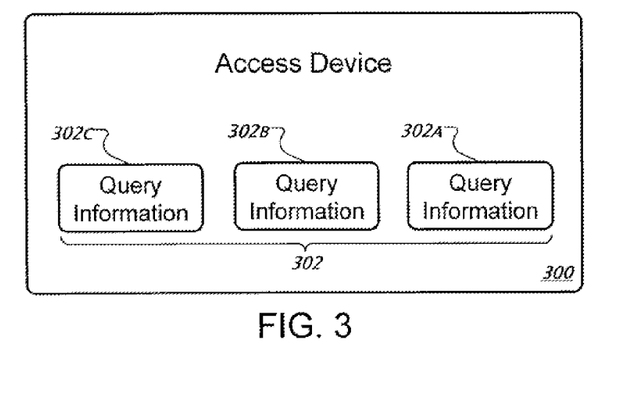
FIG. 3 shows another example of an access device.

FIG. 3 shows another example of an access device 300. In some implementations, the access device 300 can be the same as or similar to the access device 102 and/or the access device 200 described above. Particularly, the access device 300 here includes multiple instances of query information 302 that may have been stored at one or more occasions. In some implementations, the query information 302 can be the same as, or similar to, the query information 202 described above. For example, query information 302A may here reflect a most recent query that the user submitted using the access device 300. The other illustrated query information portion 302B can reflect a second-most recent query and the query information portion 302C can reflect a query submitted before that. Other, more dated, queries may have corresponding information portions on the access device, or such information portions may have been filtered out at some point due to their age.

One or more, or all, of the query information portions 300 can be accessed. For example, the advertisement server 106 can select only the query information 302A to be used because it is the most recent one. As another example, a selected subset of available query information portions (e.g., including the portions 302B and 302C, but no older ones), can be used, optionally with some weighting that gives more significance to more recent query information. In some implementations, the access device 300 can record navigations that take place after a search is performed (e.g., the navigations 124 and 138 can be recorded) and this information can be used in choosing between the portions of query information. Such information can be tracked by a plug-in program residing on the access device, to name just one example. In one implementation, only query information that is within a predetermined number of navigations (e.g., five) from the present page can be included. Other ways of selecting query information can be used. Thus, the advertisement server 106 can select the query information to be accessed from among the multiple portions of query information on the access device. Moreover, the selection can be based on a time of the query, a time the query information was stored on the access device, a number of navigations undertaken since the query, and combinations thereof.

Figure 4:
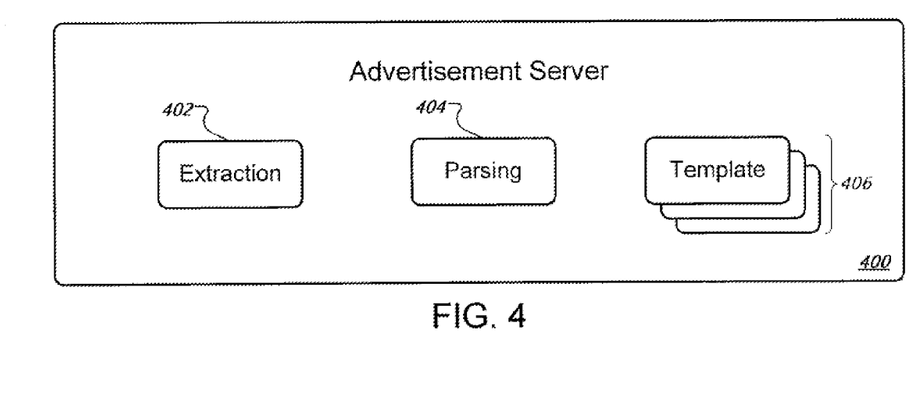
FIG. 4 shows another example of an advertisement server.

FIG. 4 shows another example of an advertisement server 400. In some implementations, the advertisement server 400 can be the same as or similar to the advertisement server 106 described above.

The advertisement server 400 here includes an extraction module 402 that can extract one or more aspects from a portion of query information. Extraction can be performed before or after query information is stored on the access device. For example, when the advertisement server 106 receives the referring URL from the results page 108B, the extraction module 402 can extract relevant information from that URL and store that extracted information (e.g., one or more key words) as the query information 202B. As another example, upon accessing the query information 202A on the access device, the extraction module 402 can perform the extraction on the URL 204 and then select the additional contents based on the extracted information.

The advertisement server 400 here includes a parsing module 404 that can parse a URL. For example, the URL 204 in the query information 202A can be parsed to obtain any or all of the key words carbonated, berry and lemonade. Any parsing technique can be used, for example by looking for the expression "q=" that precedes the key terms and then taking the words found in the rest of the URL 204. The parsing can remove intervening characters or other separators, such as the "+" characters in the URL 204. The parsing module can be included in the extraction module 402.

In some implementations, query information can be accessed using one or more templates 406. Templates can be configured to the specifics of individual search engines to help obtain information relating to corresponding searches. For example, one of the templates 406 can be configured for searches from the Google search engine, another one for the Lycos search engine, and so on. The Google template can, for example, contain information on how to parse a URL (e.g., the URL 204) and obtain the relevant information from it (e.g., any of the terms 206 can be parsed). If the name of the search engine (or another recognizable characteristic) is present in the query information to be parsed, that name (or characteristic) can be used to select the proper one of the templates 406 to be used for a particular portion of query information. Accordingly, the advertisement server 400 can perform the extraction of information from a referring URL before or after the query information is stored on the access device. Moreover, the advertisement server can parse the referring URL for at least one key word of the first query. Finally, the referring URL can be parsed using a selected one of the templates 406, each of the multiple templates configured for parsing referring URLs from a corresponding search engine.

Figure 5:
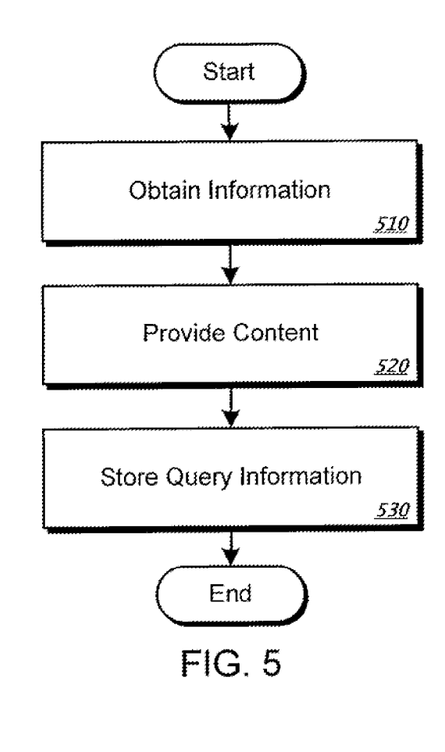
FIGS. 5 and 6 are examples of methods that can be performed.
Figure 6:
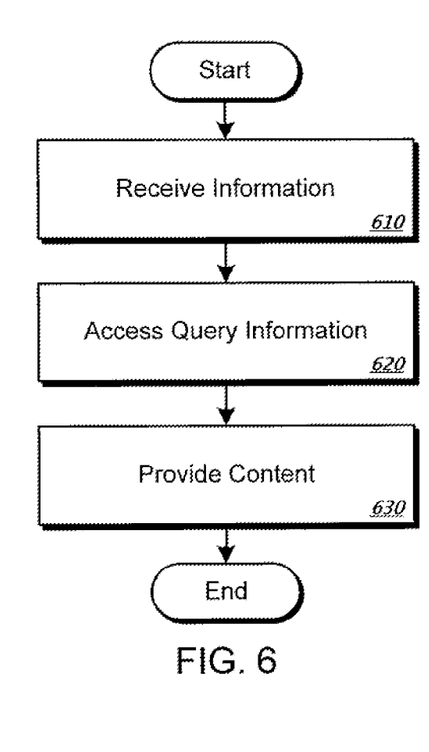

FIGS. 5 and 6 are examples of methods 500 and 600 that can be performed. For example, either or both of the methods 500 and 600 can be performed in the system 100. The methods 500 and 600 can be performed by a processor executing instructions stored in a computer-readable storage medium.

The method 500 includes, in step 510, obtaining information for providing content for a first page on an access device. The information can be extracted from a referring URL in navigation to the first page. The information reflects a first query submitted from the access device to a search provider. For example, the advertisement server 106 can obtain information relating to the results page 108B as indicated by the arrow 128.

The method 500 includes, in step 520, providing the content for inclusion in the first page. The content is selected using at least the obtained information. For example, the advertisement server 106 can provide the content 130 for the page 126A.

The method 500 includes, in step 530, storing query information on the access device based on the obtained information. The query information reflects the first query and is configured for use in providing content for at least a second page. For example, the advertisement server 106 can store the query information 132 on the access device 102 as indicated by the arrow 134.

The method 600 includes, in step 610, receiving information for providing content for an access device in response to a navigation from a first page to a second page. The content is to be included in the second page. For example, the advertisement server 106 can receive information relating to the news page 126A as indicated by the arrow 140.

The method 600 includes, in step 620, accessing query information stored on the access device. The query information is based on a first query that was submitted from the access device to a search provider before navigating to the first page. For example, the advertisement server 106 can access the query information 132 on the access device 106 as indicated by the arrow 142.

The method 600 includes, in step 630, providing the content for inclusion in the second page. The content is selected using at least the received information and the accessed query information. For example, the advertisement server 106 can provide the content 148 for the deeper page 126B.

Other steps can be included in either or both of the methods 500 and 600. Some or all of the steps of the methods 500 or 600 may be performed in another order.

Figure 7:
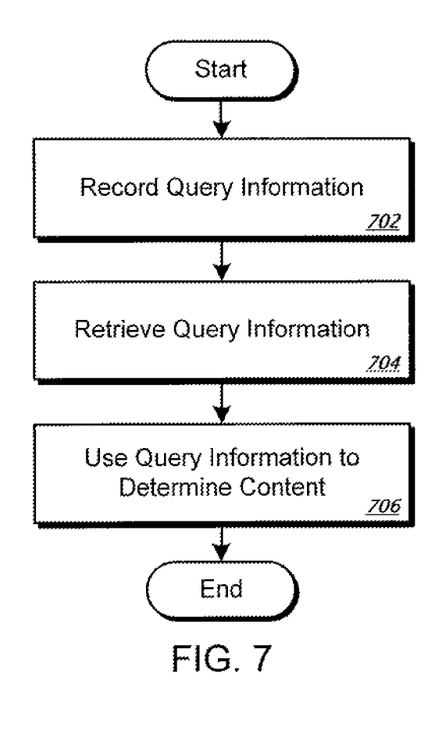
FIG. 7 shows an example method for identifying content for delivery to a user.

Referring now to FIG. 7, an example method for identifying content for delivery to a user is provided. The method can be performed by the system 100, for example. In step 702, search query information for a user is recorded. The search query information can be recorded when search results are provided or when results are identified, to name two examples. In step 704, the search query information is retrieved. In step 706, the search query information is used to determine content for display to the user.

Figure 8:
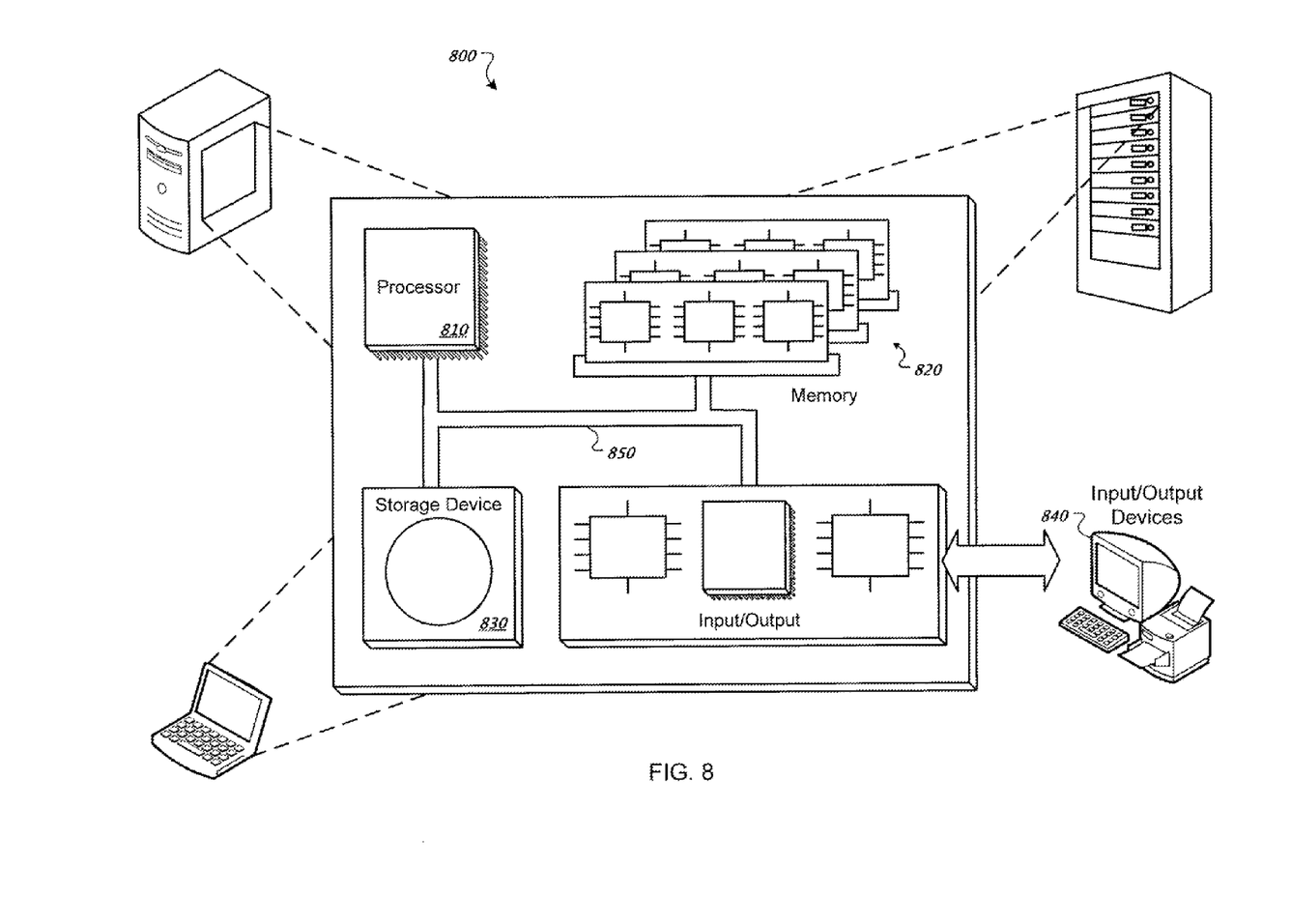
FIG. 8 is a block diagram of a computing system that can be used in connection with computer-implemented methods described in this document.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method relating to providing content on a page, the method comprising:

receiving information for providing content for an access device in response to a navigation from a first page to a second page, the content to be included in the second page;

accessing query information stored on the access device, the query information including a first query that was submitted from the access device to a search provider before navigating to the first page; and providing the content for inclusion in the second page, the content selected using at least the received information and the accessed query information.

2. The computer-implemented method of claim 1, wherein the content includes at least one advertisement to be presented on the second page.

3. The computer-implemented method of claim 2, wherein an advertisement server receives the information, accesses the query information and provides the content, and wherein the search provider includes a search engine to which the first query was submitted.

4. The computer-implemented method of claim 3, wherein the query information is included in a cookie stored on the access device, and wherein the advertisement server reads the cookie in accessing the query information.

5. The computer-implemented method of claim 1, further comprising:

receiving the first query at the search provider, the first query submitted by a user using a first previous page displayed before the first page;

displaying a second previous page to the user in response to the first query, the second previous page including a result of performing the first query and at least one link, the link directed to the first page;

receiving a first user input initiating a navigation from the second previous page to the first page using the link;

displaying the first page, the first page including at least one link, the link directed to the second page;

receiving a second user input initiating the navigation from the first page to the second page using the link on the first page; and displaying the second page including the content selected for the second page.

6. The computer-implemented method of claim 5, further comprising:

providing content for the second previous page based on the first query.

7. The computer-implemented method of claim 5, further comprising:

providing content for the first page based on the first query.

8. The computer-implemented method of claim 1, further comprising:

storing the query information on the access device before receiving the information, the query information based on other information received for providing content for the first page on the access device, the other information provided from the search provider upon receiving the first query from the access device.

9. The computer-implemented method of claim 1, wherein multiple portions of query information have been stored on the access device, further comprising:
selecting the query information to be accessed, the query information selected from among the multiple portions.

10. The computer-implemented method of claim 9, wherein the selection is based on at least one selected from: a time of the first query, a time the query information was stored on the access device, a number of navigations undertaken since the first query, and combinations thereof.

11. A computer program product tangibly embodied in a computer-readable storage medium and comprising instructions that when executed by a processor perform a method relating to providing content on a page, the method comprising:
receiving information for providing content for an access device in response to a navigation from a first page to a second page, the content to be included in the second page;
accessing query information stored on the access device, the query information including a first query that was submitted from the access device to a search provider before navigating to the first page; and
providing the content for inclusion in the second page, the content selected using at least the received information and the accessed query information.

12. A computer-implemented method relating to providing content on a page, the method comprising:
obtaining information for providing content for a first page on an access device, the information extracted from a referring URL in navigation to the first page, the information reflecting a first query submitted from the access device to a search provider;
providing the content for inclusion in the first page, the content selected using at least the obtained information; and
storing query information on the access device based on the obtained information, the query information reflecting the first query and configured for use in providing content for at least a second page.

13. The computer-implemented method of claim 12, further comprising:
receiving the first query at the search provider, the first query submitted by a user using a first previous page displayed before the first page;
displaying a second previous page to the user in response to the first query, the second previous page including a result of performing the first query and at least one link, the link directed to the first page;
receiving a first user input initiating a navigation from the second previous page to the first page using the link; and
displaying the first page, the first page including the selected content and at least one link, the link directed to the second page.

14. The computer-implemented method of claim 12, further comprising:
receiving information for providing the content for the second page in response to a navigation from the first page to the second page;
accessing the query information on the access device; and
providing the content for inclusion in the second page, the content selected using at least the received information and the accessed query information.

15. The computer-implemented method of claim 12, further comprising:
performing the extraction of the information from the referring URL.

16. The computer-implemented method of claim 15, wherein performing the extraction comprises:
parsing the referring URL for at least one key word of the first query.

17. The computer-implemented method of claim 16, further comprising:
selecting one of multiple templates for parsing the referring URL, each of the multiple templates configured for parsing referring URLs from a corresponding search engine; and
parsing the referring URL using the selected template.

18. A computer program product tangibly embodied in a computer-readable storage medium and comprising instructions that when executed by a processor perform a method relating to providing content on a page, the method comprising:
obtaining information for providing content for a first page on an access device, the information extracted from a referring URL in navigation to the first page, the information reflecting a first query submitted from the access device to a search provider;
providing the content for inclusion in the first page, the content selected using at least the obtained information; and
storing query information on the access device based on the obtained information, the query information reflecting the first query and configured for use in providing content for at least a second page.

19. A computer-implemented method comprising:
recording information reflecting a search query executed for a user;
determining that content is to be provided for display to the user, the content to be selected independently of executing the search query; and
using the recorded information to select the content.

20. The computer-implemented method of claim 19, wherein the content is advertising content and wherein the advertising content is selected to be provided for display to the user in response to another search query from the user.

* * * * *

UNITED STATES PATENT AND TRADEMARK OFFICE
CERTIFICATE OF CORRECTION

PATENT NO. : 8,341,138 B2
APPLICATION NO. : 13/209143
DATED : December 25, 2012
INVENTOR(S) : Ashutosh Garg et al.

Page 1 of 1

It is certified that error appears in the above-identified patent and that said Letters Patent is hereby corrected as shown below:

In the Claims:

Column 13, line 14, in Claim 10, delete "time the" and insert -- time of the -- therefor.

Signed and Sealed this
Fourteenth Day of May, 2013

Teresa Stanek Rea
*Acting Director of the United States Patent and Trademark Office*